INVENTOR.
Herbert G Zinsmeyer
Attorneys

United States Patent Office 3,428,861
Patented Feb. 18, 1969

3,428,861
PHOTO-ELECTRIC TIMER CONTROL
Herbert G. Zinsmeyer, 2996 Donita Court,
Birmingham, Ala. 35243
Filed Oct. 1, 1965, Ser. No. 492,105
U.S. Cl. 315—159                    2 Claims
Int. Cl. H05b 37/02, 39/04, 41/36

ABSTRACT OF THE DISCLOSURE

A photo timer in which there is provided a deactivating circuit which turns off the output to the load after a preselected time. Such circuit holds the device off even though the initiating light conditions prevail, and resets only after the light conditions reverse. For example, if set to operate with illumination, the device operates in the morning at about sunrise, and after the preset interval a deactivating circuit switches off the output and holds it off the remainder of the day while daylight prevails. When daylight ebbs, a deactivating circuit drops out and the entire circuit is reset to repeat the operation when light returns the following morning.

---

This invention relates to electric timers and more particularly to such timers in which the operating cycle is initiated in response to a pre-selected level of illumination.

A primary object of my invention is to provide a photoelectric timing control circuit which will supply current to electric equipment for a predetermined length of time in response to a preselected level of illumination such, for instance, as might obtain after sunrise.

Another object of my invention is to provide apparatus as described above which may be set to operate at sunrise, or sunset, or both.

A further object of my invention is to provide apparatus as described above in which the length of time current is supplied to the load may be varied.

A still further object of my invention is to provide apparatus as described above which is particularly adapted to operate electric equipment located in remote places.

A still further object of my invention is to provide apparatus as described above which is both compact and durable and which requires very little standby current.

Apparatus embodying features of my invention as illustrated in the accompanying drawings forming a part hereof, in which.

Figure 1:
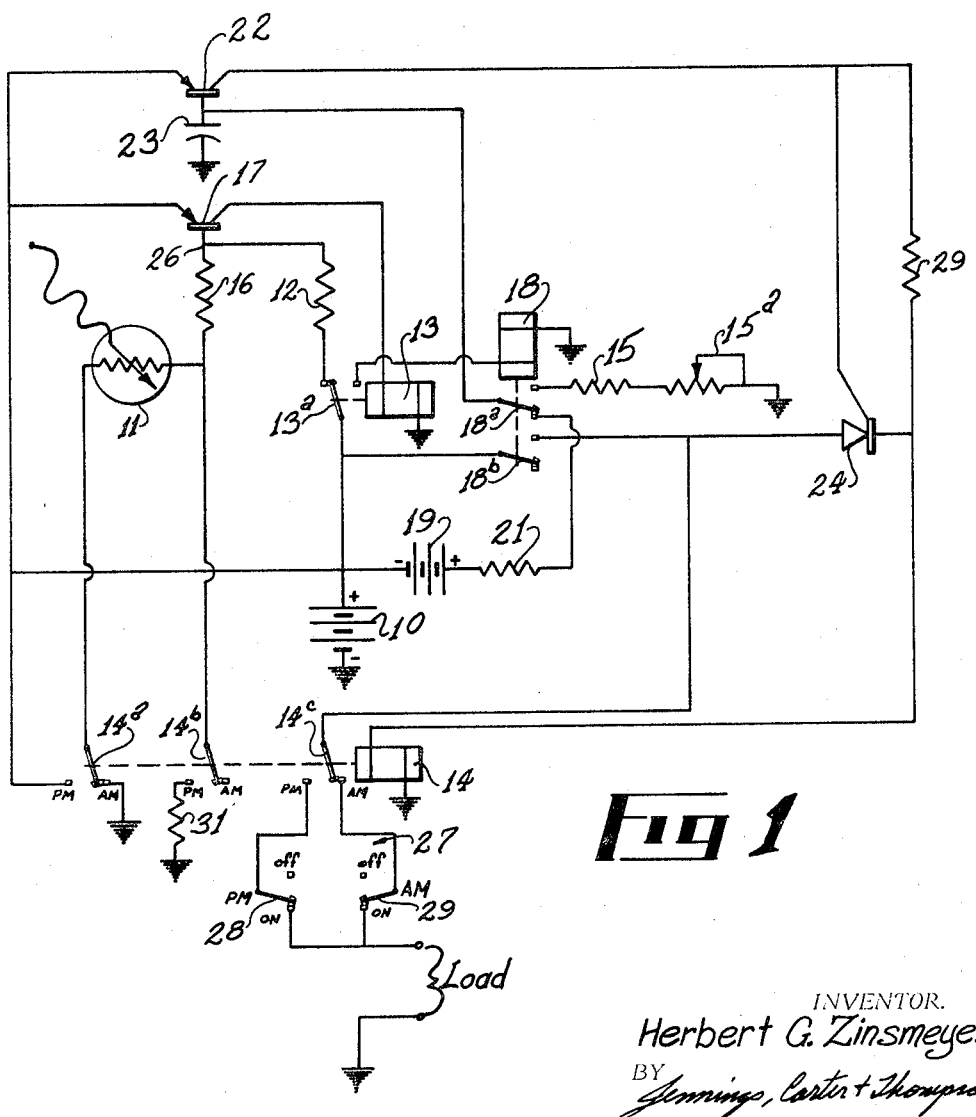
FIG. 1 is a circuit diagram of one embodiment of my photoelectric timer which is adapted to operate at sunrise, sunset, or both.

Turning now to the drawings for a better understanding of my invention I show at 10 a voltage source connected with its negative side to ground. At 11 I show a photo-resistor which is connected through resistors 12 and 16 and contacts 13ª of a relay 13 to the positive side of the battery or voltage source 10. The other terminal of the photo-resistor is connected to the arm of a two position relay switch 14ª which is controlled by a relay coil 14 described in greater detail hereinafter. One of the two positions of the contacts 14ª leads to ground while the other position is connected to the positive side of battery 10. It will be noted that the junction between resistors 12 and 16 is connected to the base of a transistor 17. The emitter of the transistor 17 is supplied with current from the positive side of the battery 10 while the collector is connected through the coil of relay 13 to ground. Thus with the circuitry as shown and with no light falling on the photo-resistor 11, the circuit is, in effect, open, as the photo resistor presents a high impedance to current flow. Since there is no current from the battery through resistor 12 to ground and therefore no current in resistor 16 there is no voltage drop between the battery and the base of the transistor and hence no current passes between the emitter and collector of the same. As the illumination level increases, as at sunrise, the photo-resistor 11 becomes more conductive and the current begins to flow in the circuit from the battery 10 through the relay contacts 13ª, resistor 12 and photo-resistor 11 to ground through contacts 14ª. At a certain level of illumination there will be a sufficient amount of current flowing in the circuit just described to forward bias the transistor emitter-base junction whereby current flows through the transistor. The current through the transistor 17 activates the relay 13 to move the contacts 13ª to their second position, thus activating the load control and timer portions of the circuit.

In the second position the relay contacts 13ª are connected to ground through a relay coil 18 which controls two sets of double position contacts 18ª and 18ᵇ. Prior to activation of relay 13 relay 18 is in its relaxed condition. The positive side of the battery 10 is then connected in series with another battery 19 through a resistor 21 and the contacts 18ª are connected to the base of a transistor 22. The base of transistor 22 is also connected to a capacitor 23. The emitter of transistor 22 is supplied with current from the positive side of the battery 10 as shown. The second position of the contacts 18ª connects through a resistor 15 and a potentiometer 15ª to ground. The contacts 18ᵇ in their relaxed or first position constitute an open switch. However, in their second position they connect the positive side of the battery 10 to the anode of a gated diode shown at 24. The collector of the transistor 22 is connected to the gate of the diode 24, and through the resistor 29 to the cathode of the diode 24. The cathode or negative side of the diode 24 is also connected to the coil of the relay 14 and thence to ground.

With the relay 13 activated as described above, current is supplied from the battery 10 to the power relay 18, thus to move its contacts 18ª and 18ᵇ to their respective second positions. With the contacts 18ª in their first position the transistor 22 is nonconductive because the voltage from the batteries 10 and 19 through resistor 21 provides a reverse bias for the base of the transistor 22. The batteries 10 and 19 also serve to charge the capacitor 23. Thus, when the contacts 18ª are moved to their second position the voltage from the batteries 10 and 19 is removed from the base side of the transistor 22, but the charge on the capacitor 23 prevents the transistor from becoming conductive just yet. However, the charge on the capacitor 23 now has a path to ground through the contacts 18ª, since they are in their second position, through resistor 15 and the potentiometer 15ª. After the charge on the capacitor 23 has leaked down to a value below the voltage supplied by the battery to the emitter of the transistor, current passes transistor 22. The time required for this to occur depends upon the capacitance of the capacitor 23 and the combined resistance of resistor 15 and potentiometer 15ª. This time interval is adjustable by potentiometer 15ª in the usual manner. When the charge on the capacitor has leaked down sufficiently to allow current to pass transistor 22 to the gate of the gated diode 24, and to resistor 29, a starting bias is provided and the gated diode 24 conducts. While the current passing the transistor 22 is insufficient to operate the relay 14, the current supplied through the diode 24 from the battery 10 is sufficient, and does operate the relay 14, thus moving its contacts 14a, 14b, and 14c to their alternate positions.

Contacts 14b are connected between ground and the base circuitry of the transistor 17 through a resistor 31.

Contacts 14c are connected between a selector circuit 27, described more fully hereinafter, and the second position of contacts 18b, whereby power may be supplied from the battery 10 through the contacts 14c to the selector circuit 27. It should be noted here that the relay 14 operates alternately, that is to say, its contacts 14a, 14b and 14c remain in the position to which they are moved by the coil 14 until the coil 14 is activated again. Thus each time the coil 14 is activated the contacts 14a, 14b and 14c move to alternate positions. The position of the contacts shown in FIG. 1 and referred to above as the first position may be called the A.M. or morning position and is so labelled in the drawing. The selector circuit comprises a pair of switches 28 and 29, each having an open and a closed position. In their closed positions the switches 28 and 29 are both connected to one side of the load to be supplied with current. Thus when the apparatus is to be operated to supply a load with current both in the morning and in the evening, that is to say, the load is to be supplied with current for period of time just after dawn, and also for a period of time just after dark, the circuit is set with both the switches 28 and 29 in their on positions. If the load is to be supplied with current in the evening only, the switch 29 is moved to its off or open position, and similarly if the load is to be supplied with current only in the morning, switch 29 is left in its closed position and the switch 28 is moved to its open position.

From the foregoing it is now possible to describe the entire operation of the embodiment of my invention illustrated in FIG. 1. Assuming the circuit elements to be in the position shown in the drawing, and assuming that the ambient light conditions are such that little or no light is falling upon the photo-resistor 11, the circuit operation may be described as follows:

Voltage is supplied from the battery 10 through the contacts 13a and the resistor 12, and to the emitters of the transistors 17 and 22. Voltage from the battery 10 plus voltage from the battery 19 is supplied through the resistor 21 and the contacts 18a to the base of transistor 22 and to the capacitor 23, thus preventing current from flowing in the transistor 22 and also charging the capacitor 23. The photo-resistor 11 presents a high resistance, in effect an open circuit between the point marked 26 and ground. Thus, there is no voltage difference between the emitter and base of the transistors 17, and thus there is no current flow in the transistor 17. As the illumination level on the photo-resistor 11 increases, its resistance decreases, in effect closing the circuit. When the illumination level on 11 reaches a point whereby its resistance is quite low sufficient current flows to cause a voltage drop through 16 and provide the forward bias necessary for transistor 17 to pass a current. Thus current is supplied to the relay coil 13 which moves contacts 13a from their first to their second position. When this is done the positive side of the battery 10 is disconnected from the base circuitry of transistor 17, and the transistor is fully forward biased and continues to supply current to the relay coil 13. When the contacts 13a are moved to their second position they supply current from the battery 10 to the relay coil 18, activating it and moving its contacts 18a and 18b to their second positions. When this occurs, the charge previously built up on the capacitor 23 is allowed to leak down through the resistor 15 and the potentiometer 15a. At the same time, power is supplied through contact 18b and contacts 14c and through the selector circuit 27 to the load, as indicated. If it were desired not to supply the load with current in the morning, switch 29 would be moved to its off position. However, the rest of the circuit would continue to operate in its usual way. After the charge on the capacitor 23 has leaked down to an amount slightly less than the voltage of battery 10, which occurs over a period of time determined by the setting of the potentiometer 15a, the transistor 22 becomes conductive, supplying current to the gated diode 24, whereby the diode then conducts to supply current from the battery 10 through contacts 18b to the coil 14. When this occurs the contacts 14a, 14b and 14c move from their first, or A.M., position to their second, or P.M. position. When these contacts are in the P.M. position, voltage from battery 10 is shunted around the base circuitry of transistor 17 through the now conducting photoresistor 11. When thus connected the illuminated photo-resistor renders transistor 17 inactive as will be further described. This has the effect of opening the circuit supplying power to the relay 13 whereby its contacts 13a return to their first position. When this occurs, the relay coil 18 is deactivated and its contacts return to their original positions, whereby power is removed from the load circuit and the transistor 22 is also cut off.

When illumination decreases, the resistance of photoresistor 11 increases until a point is reached at which the effective shunt of photo-resistor 11 is eliminated. When this occurs the current from the battery 10 flows through the base of transistor 17, contacts 14b and resistor 31, to ground. This forward biases the transistor 17 whereby it supplies current to the relay 13 which again moves its contacts 13a to their second position. The operation of the rest of the circuit is as described above, power being supplied to the load through the contacts 14c to the P.M. side of the selector circuitry 27 through switch 28 to the load. After the charge on the capacitor 23 has leaked down a sufficient amount to allow transistor 22 to conduct, the diode 24 conducts a current, operating the relay 14. The contacts 14a, 14b and 14c are thus moved back to their A.M. positions, whereby the transistor 17 is rendered nonconductive and the relay 13 is deactivated, deactivating relay 18 in turn, thus returning the entire circuit to its original condition. The circuit is now ready for the cycle to begin again when illumination increases.

Figure 2:
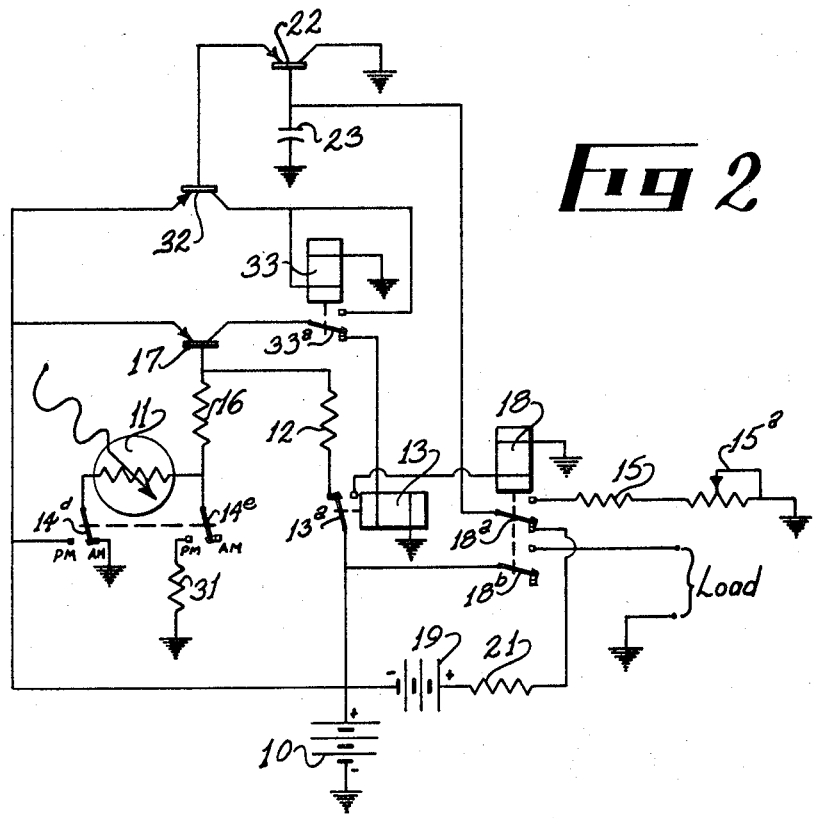
FIG. 2 is a circuit diagram of another embodiment of my photo-electric timer which is adapted for operation either at sunrise or sunset.

Referring now to FIG. 2 I show a modification of my invention which is adapted particularly to supply current to a load either in the morning or in the evening as may be selected. This circuit differs only slightly from the circuit of FIG. 1, being somewhat simplified, and therefore corresponding parts are numbered with corresponding numerals. Starting with the circuit elements in their relaxed or first positions and with the circuit selector switches set so that the circuit will deliver current to the load in the morning, the operation of the circuit is as follows. With no light falling on the photo-resistor 11, the battery 10 supplies voltage to the emitters of transistors 17 and 22, as well as to the emitter of an additional transistor 32. The transistor 32 serves in this circuit the same basic function that the diode 24 served in the circuit illustrated in FIG. 1. That is to say, the operation of the transistor 32 places the circuit in a hold condition until there is a change in the prevailing light conditions. As illumination increases, the resistance of the photo-resistor 11 decreases until a point is reached at which transistor 17 is forward biased and begins to conduct. The current from the collector of the transistor 17 passes through the contacts 33a of a relay under the control of relay coil 33 and thence through the relay coil 13 to ground, thus activating relay 13 to move contacts 13a to their second position, in turn activating the power relay 18. Prior to activation of power relay 18 the transistor 22 is held in a non-conductive state by the voltage from the batteries 10 and 19, which are connected through resistor 21 and contacts 18a to the base of transistor 22. This voltage also charges capacitor 23 which is connected to the base of the transistor 22. When the relay 18 operates to move contacts 18a to their second position, the charge on capacitor 23 drains off through resistor 15 and potentiometer 15a to ground. After a certain period of time, variable by the potentiometer 15a, the charge on the capacitor 23 is reduced to such an extent that the emitter-base junction of transistor 22 is forward biased and the transistor begins to conduct. When this occurs, a forward bias for the emitter-base junction of transistor 32 is provided and it also begins to conduct. The current from the collector of transistor 32 activates relay 33, moving contacts 33ª to their second position. This provides a holding circuit from transistor 17 through relay coil 33 to ground to hold the relay contacts 33ª in their second position. This also breaks the circuit for relay 13 which allows contacts 13ª to return to their first position whereupon relay 18 relaxes. The transistor 17 is forward biased and therefore in a conductive state so long as a sufficient amount of light falls on photo-resistor 11 to maintain it in a relatively low resistance state.

From the foregoing it is seen that after the timer circuit comprising the capacitor 23, resistor 15 and potentiometer 15ª times out, relay 33 is energized thus opening the power circuit to the load. Once relay 33 is energized the required holding circuit is supplied by transistor 17 so long as light continues to fall on photo-resistor 11. When the illumination level drops below a certain value transistor 17 ceases to conduct and relay 33 is de-energized, thus returning the circuit to its original condition. Thus current is supplied to the load for a predetermined period of time after light commences to fall on photoresistor 11.

The circuit illustrated in FIG. 2 may also be set so as to supply power to the load in the evening, that is to say, when illumination ceases to fall on photo-resistor 11. This is done by manually operating the gang switches 14ᵈ and 14ᵉ whereby battery power is supplied to the transistor 17 base circuitry through the low resistance of photo-resistor 11 and resistor 16 so long as light falls on the photo-resistor. Forward bias now occurs in darkness when the photo-resistor is non-conducting.

Figure 3:
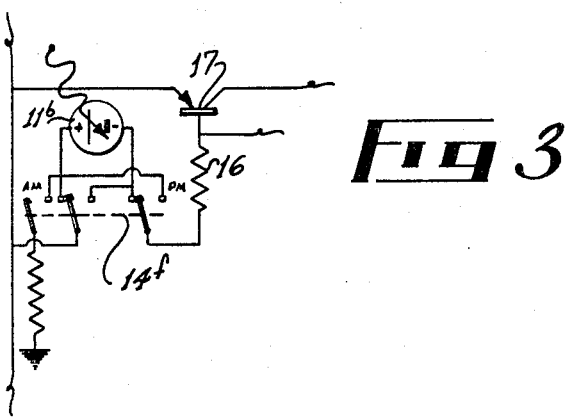
FIG. 3 is a fragmentary circuit diagram in which the photo-electric circuit element is a photovoltaic cell.

Instead of using the photo-resistor described above in these circuits it is sometimes desirable to use a photo-voltaic cell, that is to say, a photo-electric cell which generates a current when light falls thereupon, such as a selenium or silicon cell. The circuitry for use with a cell of this type is illustrated by the fragmentary diagram of FIG. 3 in which the photocell is indicated at 11b. For operation in the morning the positive terminal of the photocell 11ᵇ is connected to the emitter of transistor 17 and the negative terminal to the base thereof. For operation in the evening switch 14ᶠ is moved so that the polarity of the photocell 11ᵇ is reversed, and a resistance is placed between the transistor base and ground.

From the foregoing it is seen that I have devised a new and improved photo-electric timer system which is effective to provide electric power to a load either in the morning or in the evening or both. My timer is positive in action and may recycle itself in an entirely automatic manner. Its components are selected for durability and low current consumption, and the standby current required is negligible.

While I have shown my invention in several forms, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a photoelectric timing means for controlling an electrically responsive load,
    (a) a voltage source,
    (b) control circuitry between said load and said voltage source including a photo-responsive element effective under selected light conditions to connect said load and said voltage source.
    (c) an electric timer in said control circuit comprising,
        (1) a transistor having a capacitor between its base and the ground,
        (2) a voltage source effective to supply a reverse bias for the transistor and to charge the capacitor,
        (3) a variable resistance connected at one end to ground,
        (4) means to disconnect the base of the transistor from the voltage source and to connect the base of the transistor to ground through said variable resistance in response to selected light conditions whereby a change in the charge of the capacitor passing through the resistance allows the transistors to conduct after a predetermined time, and
        (5) means controlled by the output of the transistor and effective to disconnect the load and voltage source and hold them disconnected so long as said selected light conditions prevail.

2. In a photoelectric timing means for controlling an electrically responsive load,
    (a) a voltage source,
    (b) control circuitry between said load and said voltage source including a photo-responsive element effective under selected light conditions to connect said load and said voltage source,
    (c) an electric timer in said control circuit effective to disconnect said load and said voltage source a predetermined time after connection thereof,
    (d) means effective upon operation of said timer to hold the circuit disconnected from the load and the voltage source so long as the selected light conditions prevail,
    (e) means effective upon change from said light conditions to different selected light conditions to ready said control circuitry for repeating the load energizing sequence upon reappearance of said first selected light conditions,
    (f) photoelectric control circuirtry comprising:
        (1) a photoelectric circuit element,
        (2) a control transistor,
        (3) the output of the control transistor being controlled by the photoelectric circuit element in response to a preselected light condition,
        (4) a control relay activated by the output of the control transistor and effective to connect the voltage source to the load and energize said electric timing means,
        (5) a mode selector switching circuit providing means for connecting the photoelectric circuit to the selected light conditions of either light or darkness, and
    (g) said electric timing means comprising:
        (1) a voltage source effective to supply power to the timer circuitry,
        (2) a variable resistance in circuit with a capacitor and effective to provide an adjustable electric energy flow when connected to or disconnected from a voltage source,
        (3) a timer transistor connected to detect a reference energy flow in the resistor-capacitor circuit and produce an amplified output, and upon energization by the control circuit relay to energize said electric timing circuit, and
        (4) a timer relay controlled by the output of the timer transistor and affording the following functions:
            (a) to disconnect the output of the control transistor from the control relay, in turn effective to disconnect the load and voltage source and deenergize the electric timer,
            (b) to reconnect the output of the control transistor to energize the said timer relay, thereby to hold the load and voltage source disconnected so long as said selected light conditions prevail, and
            (c) permit reconnection after said light conditions have ceased to prevail due to the insufficient output of the control transistor, allowing the timer relay to return to the initial inactive, but ready position.

References Cited

UNITED STATES PATENTS 3,231,747   1/1966   Takeda et al. ........ 250—215
3,273,012   9/1966   Rosenblum ........ 315—159 X

FOREIGN PATENTS 820,608   9/1959   Great Britain.

JAMES W. LAWRENCE, Primary Examiner.

E. R. LA ROCHE, Assistant Examiner.

U.S. Cl. X.R.

250—206